Aug. 9, 1966  F. X. WOJCIECHOWSKI ET AL  3,265,136
DESCENT MECHANISM
Filed March 2, 1964  3 Sheets-Sheet 1
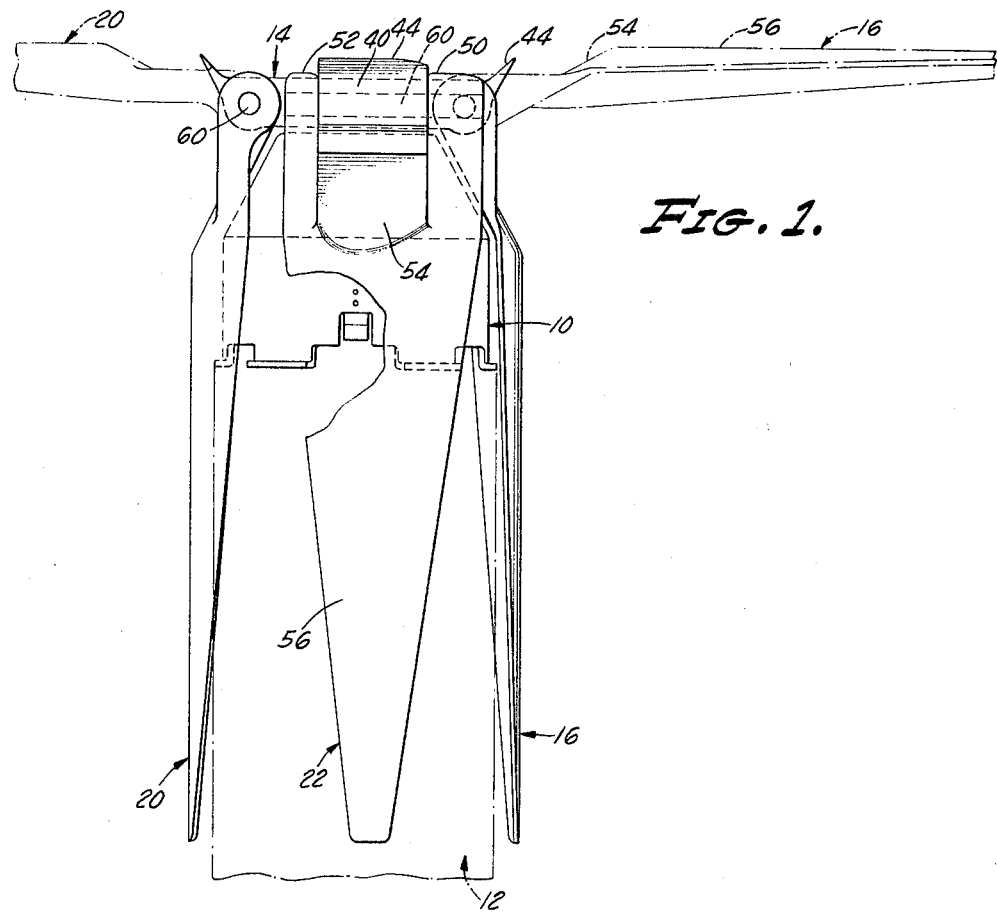
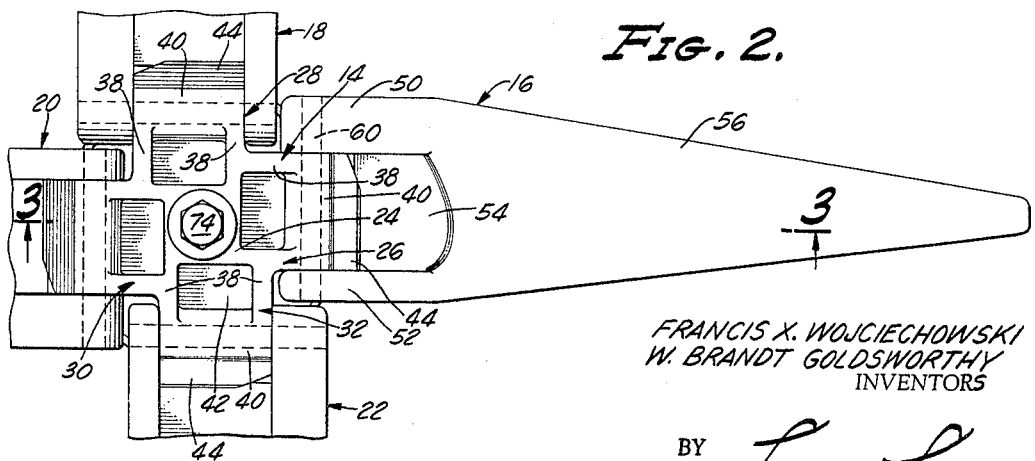
FRANCIS X. WOJCIECHOWSKI
W. BRANDT GOLDSWORTHY
INVENTORS
BY *Lyon & Lyon*
ATTORNEYS

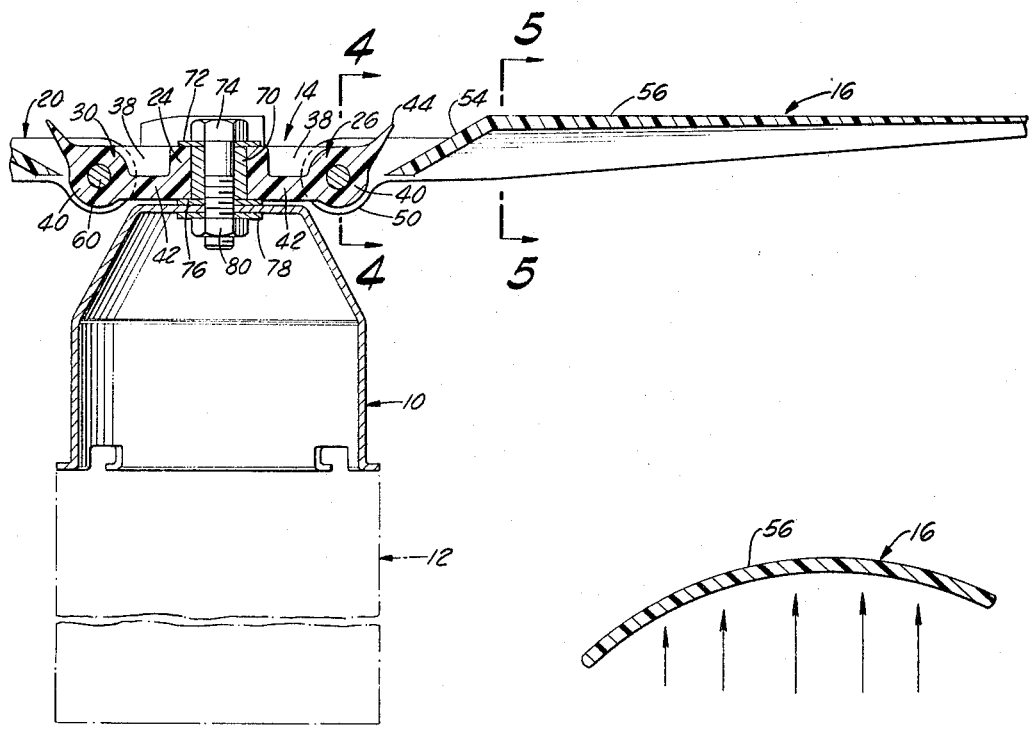
Fig. 3.
Fig. 5.
Fig. 4.
FRANCIS X. WOJCIECHOWSKI
W. BRANDT GOLDSWORTHY
INVENTORS
BY 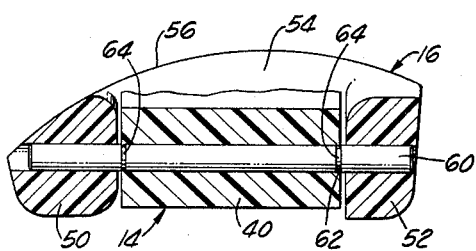
ATTORNEYS

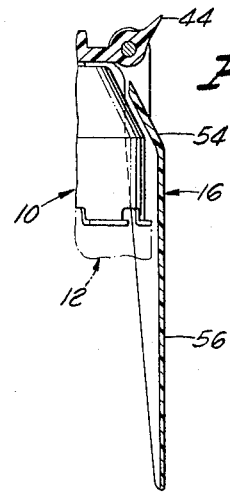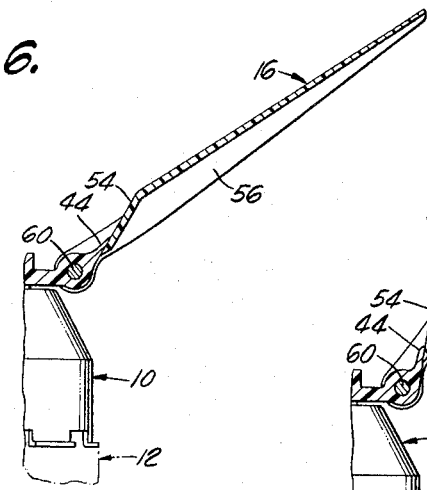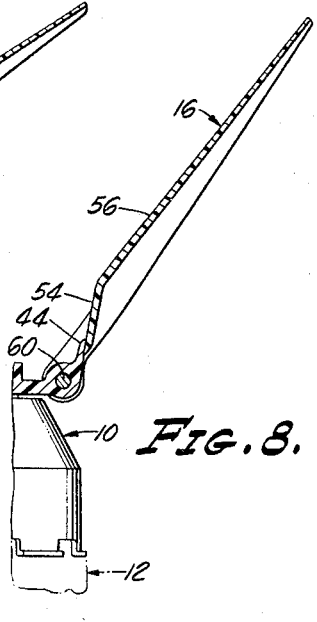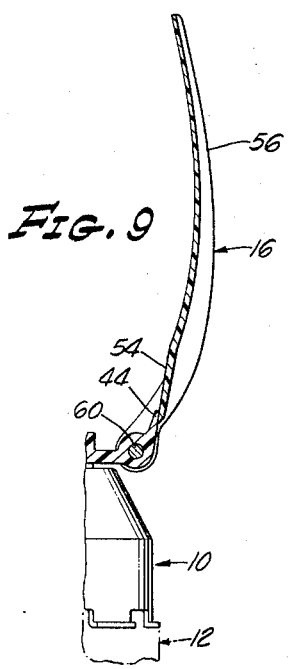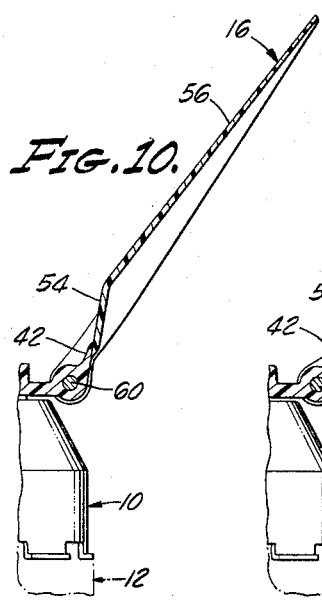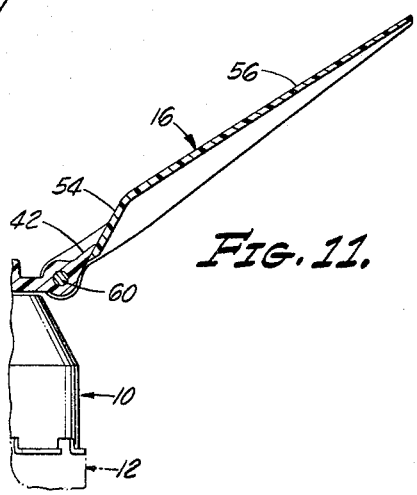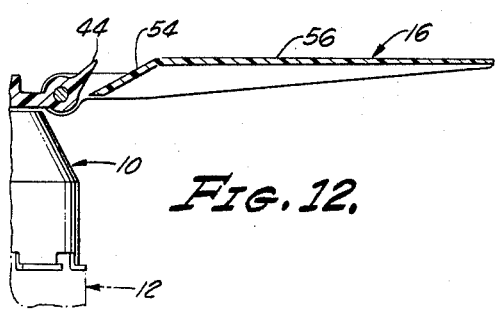

United States Patent Office 3,265,136
Patented August 9, 1966

1

3,265,136
DESCENT MECHANISM
Francis X. Wojciechowski, Garden Grove, and William
 Brandt Goldsworthy, Palos Verdes Estates, Calif.,
 assignors to Hoffman Electronics Corporation, El
 Monte, Calif., a corporation of California
Filed Mar. 2, 1964, Ser. No. 348,568
8 Claims. (Cl. 170—160.12)

This invention relates to a descent mechanism and more particularly relates to a device for reducing the speed of descent of an object dropped from an aircraft and reducing the shock loads exerted on the object.

There are many instances in which objects must be dropped from aircraft to the earth in which the speed of descent and the shock loads exerted on the object must be reduced but in which the use of parachutes are not feasible or desirable. For example, in the search for submarines or other underwater objects, a plurality of radiosonic buoys combining a detector and a radio transmitter are dropped from an aircraft overflying the suspected area. Means must be provided for lowering such a payload in a predictable trajectory after it has been launched from the aircraft in a manner that will prevent damage to the delicate electronic gear which it contains. The devices currently used for this purpose act on the autorotation principle and are commonly known as rotochutes.

The rotochutes currently in use have four blades fabricated from forged or stamped aluminum and machined into a slight taper. The blades must be balanced with great care to give aerodynamic stability to flight. The base material and forging must be of high quality to sustain the high loads of opening into the aircraft wind stream. The blade curvature has an airfoil shape with a proper attack angle to provide autorotation and lift. These blades are attached by a hinge pin to an aluminum extrusion which provides the necessary structural support. The opening shock of these blades is attenuated by a hard rubber bumper backed by a steel spring plate. The assembly is riveted and attached to a steel bearing collar to allow free rotation. The blade must fold around the supporting structure in a cylindrical configuration as the rotochutes are ejected from the aircraft through a cylindrical launching chute or tube.

This type of descent mechanism or rotochute has several disadvantages. The device is not sufficiently flexible to progressively attenuate the shock forces so that they are not transmitted to the payload. The manner in which it is constructed does not enable the device to survive launch speeds in excess of 250 knots. The precise machining that is necessary contributes to a high cost of manufacture as does the necessity that the blades be so evenly balanced. The various metals of which the rotochute is constructed give it an excessive weight, and the inflexibility of the blades results in decreased reliability because frequently the blades damage the operating package on launching and occasionally even damage the launching aircraft itself.

According to the present invention, a descent mechanism is provided which operates on the autorotation principle but does not have the aforementioned disadvantages. The mechanism of the present invention utilizes a trunnion formed of plastic as a single molded component and four blades which are also molded of plastic and are severely tapered. The trunnion and blades are formed in such a way that the trunnion attenuates the peak shock loads and does not transmit them to the payload. The blades are able to flex through a 90° arc to provide aerodynamic unloading and yet their hysteresis rate and elastic memory are sufficient to provide rapid recovery into flying position in order to insure predictable flight trajectory.

The descent mechanism or rotochute of the present invention has a low cost of manufacture and assembly. In addition, it weighs considerably less than similar devices heretofore obtainable and thus has a higher aerodynamic performance and lower shipping cost. Being made of plastic, corrosion problems during storage are eliminated. This plastic construction also leads to increased ease of launching because of the low friction co-efficient of the blades, and furthermore reduces the probability of the aircraft or the payload being damaged upon launching.

It is therefore an object of the present invention to provide an improved device for reducing the speed of descent and the shock loads exerted on an object jettisoned from an aircraft.

It is also an object of the present invention to provide such a device in which the major components are formed of a lightweight plastic material.

It is another object of the present invention to provide such a device in which a plurality of blades are mounted on a trunnion which is formed so as to attenuate the peak shock loads.

It is a further object of the present invention to provide such a device in which the blades are formed so as to provide aerodynamic unloading when the device is jettisoned from the aircraft and yet are quick to recover to a position of maximum autorotation and lift.

These and other objects and advantages of the present invention will become more apparent upon reference to the accompanying description and drawings in which:

FIGURE 1 is a front elevation of the device of the present invention;

FIGURE 2 is a top plan view of a portion of the device of the present invention showing the blades in flying position;

FIGURE 3 is a sectional view taken along lines 3—3 of FIGURE 2;

FIGURE 4 is a sectional view taken along lines 4—4 of FIGURE 3;

FIGURE 5 is a sectional view taken along lines 5—5 of FIGURE 3;

FIGURES 6, 7, 8, 9, 10, 11 and 12 show the various stages in the positioning of the blades after the device has been jettisoned from an aircraft.

Referring now to the several figures, and in particular to FIGURES 1, 2 and 3, the descent mechanism or rotochute of the present invention includes a bell housing 10 which is attached in any suitable fashion to an object 12 which is to be ejected from an aircraft. A trunnion 14 is mounted on the bell housing 10 and mounts four blades 16, 18, 20 and 22. The trunnion is formed as a single component of a suitable tough resilient plastic material, preferably nylon. The blades are preferably also formed of nylon.

The trunnion 14 is provided with a central hub portion 24 and four projecting arms 26, 28, 30 and 32. Each of these arms preferably consist of a pair of ribs 38 which terminate in a cylindrical hinge 40 and which are joined by a base web 42. The end of each arm 26, 28, 30 and 32 beyond the cylindrical hinge 40 is provided with a portion or ear 44 which extends upwardly and outwardly and has a section gradually decreasing to a point. This portion or ear 44 is the portion of the trunnion which is first engaged by the blades and acts to attenuate the loading forces, as will be explained in connection with FIGURES 6 through 12.

Each of the blades 16, 18, 20 and 22 has a bifurcated base in which fingers 50 and 52 extend on either side of the hinge 40 for cooperation therewith. The fingers 50 and 52 are joined by an inclined web 54 which cooperates with the extending portion 44 of the trunnion. The hinges 40 of the trunnion and the fingers 50 and 52 of the blades are positioned relative to the hub 24 of the trunnion in such a manner that the blades fold down over the bell housing 10 and object 12 in the form of a right cylinder as is required by the nature of the lauching tube. This offset positioning is necessary because of the airfoil shape of the tapered portion 56 of each blade. An airfoil shape is, of course, necessary to provide maximum lift and the proper attack angle for autorotation in order for the device to maintain the specified descent rate.

Each of the blades is provided with a severely tapered portion 56 because it has been found that the lift is increased and the drag decreased by removing as much of the material which moves at a high speed relative to the inner part of the blade as possible. This taper also decreases the shock load at the time of ejection because the shock load is a function of weight times distance, and by tapering, the weight at the greatest distance is decreased. Preferably, the width of the tip of the blade is less than one third the width of the widest part of the blade. As can be seen in FIGURE 3, the blades are tapered longitudinally as well as laterally so that they are able to absorb the shock loads gradually.

As best shown in FIGURE 4, the blades are mounted on the hinges by means of a shaft 60 which is passed through the fingers 50 and 52 and the hinge 40. In order to simplify the construction of the device, the hinge 40 is preferably provided with an annular ridge 62 at either end and the shaft 60 is provided with grooves 64 spaced at corresponding points along its length. To mount the blade on the hinge, it is only necessary to align the passageways of the fingers and the hinge and insert the shaft 60 until the ridges 62 are positioned in the grooves 64. Since the blades are made of a plastic material such as nylon, the fingers 50 and 52 have low friction bearing surfaces and can move freely on the shaft 60.

In mounting the trunnion and blade assembly on the bell housing 10, a metal sleeve 70 is positioned in a suitable passageway formed in the hub portion 24 of the trunnion 14 and a washer 72 placed over it. A bolt 74 is then passed through the washer 72, a second washer 76, the upper surface of the bell housing 10, a third washer 78, and secured in position by a nut 80. The trunnion, being constructed of nylon or the like, provides a low friction bearing surface to the sleeve 70 and thus minimizes the transfer of rotation from the descent mechanism to the payload 12.

The operation of the descent mechanism or rotochute of the present invention is illustrated by FIGURES 6 through 12. While only one blade is illustrated in each of these figures, it should be understood that each of the other three blades operates in the same manner. FIGURE 6 shows the position of the blade prior to ejection from the aircraft.

FIGURE 7 shows the position of the blade immediately after the device has been ejected from the aircraft. In this figure, the blade is shown just as the web portion 54 engages the outermost tip of the extended portion or ear 44 of the trunnion. Because of the gradually decreasing section of the portion 44, the thin tip section bends first and the blade gradually bears against a heavier and heavier cross section. This gradual bending applies a gradual resistive load in opposition to the applied load. This progressive pattern of resistance to the load provides maximum flattening effects on the attenuation curve and thus smooths out the peaks of high impact loads, FIGURE 8 shows the position of the blade when the web 54 has caused the entire portion 44 to have bent. At this point, the force exerted by the portion 44 is sufficient to prevent the web 54 from bending it further. To continue the gradual unloading of the shock loads, the blade itself now begins to bend, first at the outer end where it is thinnest, and then gradually the whole tapered portion 56 of the blade is bent until it has flexed through an arc of 90° from its normal flying position (shown in phantom in FIGURE 1) to the position shown in FIGURE 9. Maximum aerodynamic unloading has now been achieved.

The resiliency of the blade now causes it to recover or spring back from the stressed position of FIGURE 9. The hysteresis rate and the elastic memory of a plastic material such as nylon is such that the blade will quickly recover to its normal shape as can be seen in FIGURE 10. At this time, the projection 44 is still maintained in its stressed position by the web 54.

In FIGURE 11, the elasticity of the projection 44 has caused it to exert a force on the blade to bring the blade to a position where it no longer bends or stresses the projection 44. The blade has now been returned to a position such that its airfoil shape will cause it to assume the proper flying position to give it maximum lift with the proper attack angle for autorotation, as shown in FIGURE 12.

The elastic memory and hysteresis rate of the plastic material is such that this recovery happens very quickly and predictably and thus insures a predictable flight trajectory—a necessary feature as equipment such as radiosonic buoys are generally dropped into a definite pattern. Nylon has the further advantage of eliminating the problem of corrosion in salt water. If desired, various colors can be incorporated into the plastic material for purposes of visual spotting and identification.

From the foregoing description, it can be seen that an improved descent mechanism or a rotochute has been provided which is lighter, cheaper, and of superior operating characteristics to similar devices presently available. These advantages are the result of an improved structural design and the use of a suitable plastic material to form a one piece trunnion and flexible blades. The use of this device also decreases the probability of damage to the payload or to the aircraft when the device is launched and also enables the device to be launched from planes traveling at greater speeds than has heretofore been possible. The devices may also be launched from a higher altitude as the nylon bearing prevents the freezing which occurs in conventional metal devices when they travel too far.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A descent mechanism comprising: a housing adapted to be fastened to an object; a trunnion, said trunnion having a hub portion and a plurality of arms projecting outwardly from said hub portion, each of said arms having a hinge adjacent the outer end thereof; means rotatably mounting said trunnion on said housing; a plurality of deformable resilient airfoils, each of said airfoils being hingedly mounted on one of said hinges for pivotal movement from a folded to an extended flight position about an axis substantially perpendicular to the axis of rotation of said trunnion; and resilient means mounted on each of said arms for engaging and exerting a force on the corresponding airfoil when said airfoil has pivoted about said axis through a predetermined arc, said arc being greater than the arc described by said airfoils when in their extended flight position wherein said resilient portions are spaced from said airfoils.

2. Apparatus for reducing the speed of descent and the shock loads exerted on an object dropped from an aircraft or the like comprising: a housing adapted to be fastened to said object; a trunnion, said trunnion having a hub portion and a plurality of arms extending outwardly from said hub portion, each of said arms having an integral hinge formed adjacent the outer end thereof; means rotatably mounting said trunnion on said housing; a plurality of deformable, resilient airfoils, each of said airfoils being hingedly mounted on one of said hinges for pivotal movement from a folded to an extended flight position about an axis substantially perpendicular to the axis of rotation of said trunnion, whereby said airfoils assume a flight position substantially perpendicular to said housing; and resilient means integrally formed on each of said arms for engaging and exerting a gradually increasing force on the corresponding airfoil when said airfoil has pivoted about said axis through a predetermined arc, said arc being greater than the arc described by said airfoils in the extended flight position.

3. Apparatus for reducing the speed of descent and the shock loads exerted on an object dropped from an aircraft or the like, comprising: a housing adapted to be fastened to said object; an integral trunnion including a hub portion, a plurality of arms extending outwardly from said hub portion, a hinge formed adjacent the outer end of each of said arms, and a resilient portion formed outwardly of each of said hinges, said resilient portions having sections generally decreasing to a point; means rotatably mounting said trunnion on said housing; and a plurality of deformable resilient blades, each of said blades being hingedly mounted on one of said hinges for pivotal movement from a folded to an extended flight position about an axis substantially perpendicular to the axis of rotation of said trunnion, each of said blades having an airfoil configuration sufficient to impart autorotation to said apparatus, said blades being substantially perpendicular to said housing when in the extended flight position; said resilient portion formed on each arm engaging the corresponding blade when said blade has pivoted about said axis through a predetermined arc, said arc being greater than the arc described by said blade in said flight position, said resilient portion exerting a gradually increasing force on said blade, said blade being gradually deformable upwards when the force exerted by said resilient portion is large, said blade spaced from said resilient portion in said extended flight position.

4. The apparatus of claim 3 wherein said arms and said hinges are offset so said airfoils can be folded into a right cylinder.

5. The apparatus of claim 3 wherein said trunnion and said airfoils are formed of a plastic material having a low friction coefficient.

6. The apparatus of claim 5 wherein said rotatably mounting means includes a sleeve fastened to said housing, said sleeve being inserted into an opening formed in said hub portion and bearing against said hub portion.

7. Apparatus for reducing the speed of descent and the shock loads exerted on an object dropped from an air aircraft or the like, comprising: a housing adapted to be fastened to said object; an integral trunnion including a hub portion, a plurality of arms extending outwardly from said hub portion, a hinge formed adjacent the outer ends of each of said arms, and a resilient portion formed outwardly of each of said hinges, said resilient portions having sections generally decreasing to a point; means rotatably mounting said trunnion on said housing; and a plurality of deformable resilient airfoils, each of said airfoils being hingedly mounted on one of said hinges for pivotal movement from a folded to an extended flight position about an axis substantially perpendicular to the axis of rotation of said trunnion, said airfoils being tapered away from said hinges in both width and thickness; said resilient portion formed on each arm engaging and exerting a gradually increasing force on the corresponding airfoil when said airfoil has pivoted about said axis through a predetermined arc, said arc being greater than the arc described by said airfoils when in their extended flight position wherein said resilient portions are spaced away from said airfoils.

8. The apparatus of claim 7 wherein the tip of said airfoil has a width of less than one third the width of the widest part of the airfoil.

References Cited by the Examiner

UNITED STATES PATENTS

| | | | |
|---|---|---|---|
| 1,971,016 | 8/1934 | Pecker | 170—160.52 |
| 2,044,819 | 6/1936 | Taylor. | |
| 2,416,178 | 2/1947 | Kearns | 170—160.52 |
| 2,484,739 | 10/1949 | Remmen | 170—160.52 |
| 2,495,486 | 1/1950 | Stevenson | 244—138.1 |
| 2,614,636 | 10/1952 | Prewitt | 170—160.5 |
| 2,678,785 | 5/1954 | Graham | 170—160.57 |
| 2,917,255 | 12/1959 | Boyd | 170—160.5 X |
| 2,990,149 | 6/1961 | Samms | 244—138 |
| 3,033,293 | 5/1962 | Bihlmire | 170—159 |
| 3,115,831 | 12/1963 | Suter | 244—138.1 |

FOREIGN PATENTS 438,111    11/1935    Great Britain.

EDGAR W. GEOGHEGAN, *Primary Examiner.*

JULIUS E. WEST, SAMUEL LEVINE, *Examiners.*

E. A. POWELL, JR., *Assistant Examiner.*